United States Patent [19]

Friedman

[11] 4,159,009
[45] Jun. 26, 1979

[54] RAISING SAC FRY OR ALEVINS IN DENSELY PACKED INCUBATORS

[75] Inventor: Barry A. Friedman, West Nyack, N.Y.

[73] Assignee: Domsea Farms, Inc., Bremerton, Wash.

[21] Appl. No.: 809,925

[22] Filed: Jun. 24, 1977

[51] Int. Cl.² .................. A01K 61/00; A01K 63/00
[52] U.S. Cl. ........................................................ 119/3
[58] Field of Search ............................. 119/3, 2, 4

[56] References Cited

U.S. PATENT DOCUMENTS

| 2,944,513 | 7/1960 | Keely | 119/3 |
| 3,464,385 | 9/1969 | Pellett, Sr. | 119/3 |
| 3,584,602 | 6/1971 | Stasio | 119/5 |
| 3,716,025 | 2/1973 | Lawson | 119/3 |
| 3,716,026 | 2/1973 | Gross | 119/3 |
| 3,738,317 | 6/1973 | Reynolds | 119/3 |

OTHER PUBLICATIONS

Doudoroff, Physiology of Fishes, Academic Press 1957, pp. 403 & 413–416.
U.S. Dept. of the Interior, Fish and Wildlife Service, No. 58.
The Progressive Fish-Culturist, Jul. 1974, vol. 36, No. 3, Rucker et al., pp. 152–156.
State of California, Fish Bulletin No. 107, Trout and Salmon Culture, Earl Leitritz 1972, pp. 56 & 57.
State of California, Fish Bulletin 164, Trout and Salmon Culture, E. Leitritz & Lewis, 1976, pp. 67–70.
Heath Fish Incubation Cabinet Model 369, Year uncertain, no later than 1976.
Heath Tecna Corporation, Installation and Operation Instructions, Model 369, 1972.

Primary Examiner—Hugh R. Chamblee
Attorney, Agent, or Firm—Owen, Wickersham & Erickson

[57] ABSTRACT

Alevins or sac fry can be efficiently incubated under crowded conditions such that the biomass-to-water weight ratio is between 48:1 and 100:1; provided that oxygenated water—rather than aerated water—is circulated through the incubator. Preferably, the water, when leaving the incubator contains approximately seven to fifty milligrams per liter of dissolved oxygen.

12 Claims, 2 Drawing Figures

RAISING SAC FRY OR ALEVINS IN DENSELY PACKED INCUBATORS

BACKGROUND OF THE INVENTION

This invention relates to a method of incubating alevins. It enables the alevin or sac fry density to be considerably greater than has been feasible heretofore without adversely affecting the sac fry or alevins.

The invention has particular relation to the incubation of salmonids, especially salmon and trout, but also applies to other fish which do not have a larval stage. The artificial spawning of salmon and trout employs incubators wherein the fertilized egg develops, first, to the "eyed egg" stage, next, to the hatching stage, and finally to absorption of the yolk sac by the alevin or sac fry, prior to swimup. For example, the total incubation period of coho salmon eggs is approximately 68 days at about 11° C., of which the third stage occupies approximately 21 days, from the hatching of the egg to the complete absorption of the yolk sac. At the end of the third stage the alevins or sac fry have become fry and are transferred to another container in the hatchery.

The development of a fertilized egg from the time of its fertilization through the end of the alevin stage (i.e., "swimup") is dependent upon many factors. Significant factors include the water flow rate, the oxygen content of the water, the temperature of the water, the pH of the water, its alkalinity, its ammonia-nitrogen content, its turbidity, its carbon dioxide content, and its carrying of disease-inducing organisms. Some of these are relatively easily adjusted and the ranges are well known. The temperature of the water varies with the type of fish; for salmon and trout it is typically in the range of 7°–17° C. (45°–63° F.) with optimum conditions for salmon and trout being around 11° C. (52°–53° F.). Interfering suspended solids, presence of disease organisms, carbon dioxide, pH and alkalinity are also known factors that must be considered and adjusted.

During the entire incubation period water flow is essential, and it is especially important during the third or alevin stage, for two main reasons: (1) to remove waste and (2) to carry oxygen to the alevins. To amplify, the proper flow of water during the alevin stage is important in eliminating nitrogenous wastes, which can be measured as ammonia toxicity, and in maintaining the oxygen requirement, which increases during the alevin stage. However, the water flow rate can be too high during the period of incubation, and if it is, it weakens the alevin, reducing their ability to gain weight and increasing their susceptibility to various disease conditions.

Probably the second most important factor, next only to the flow rate of the water, is the oxygen content of that water. Oxygen content, I have found, is extremely important in the capacity of any hatching apparatus. In the past, I have found that hatching trays or other containers have sometimes been overloaded with alevins with respect to the oxygen content. When the oxygen concentration fell too low the rate of fish mortality has increased to unacceptable levels. I have also found that oxygen levels high enough to maintain the fish may still be too low for proper growth.

Hatchery equipment has become quite expensive; so that tray space is at a premium. As a result, it is uneconomical to utilize the hatchery trays at amounts below capacity. Yet these lower densities have been employed heretofore because otherwise the loss in fish has been too great. I find that this loss in fish has been caused by the alevins receiving insufficient oxygen under crowded conditions.

In the past the oxygen content of the water used in hatcheries has varied rather widely. The water may be naturally saturated with air, or saturation may be achieved by any of several air-impinging techniques, such as bubbling air through a water column, using airlift pumps, impinging sprays of water on open containers of water, or trickling water through beds of rocks, oyster shell, or other media. All of these techniques yield water that is in equilibrium with air. All of these conventional means for supplying dissolved oxygen to the alevins have had a serious disadvantage: since air contains about four times as much nitrogen as it does oxygen, the partial pressure of oxygen is inadequate for the purpose. Table I shows the solubility of oxygen in water in equilibrium with air.

TABLE I
Solubility Of Oxygen In Water Exposed To Water-Saturated Air

| Temperature in °C. | Dissolved Oxygen (mg/l) |
|---|---|
| 0 | 14.6 |
| 4 | 13.1 |
| 8 | 11.9 |
| 12 | 10.8 |
| 16 | 10.0 |
| 20 | 9.2 |
| 24 | 8.5 |
| 28 | 7.9 |
| 32 | 7.4 |
| 36 | 7.0 |
| 40 | 6.6 |

From Table I it will be seen that when water is at about 12° C. or approximately 54° F., the dissolved oxygen in the air-saturated water is approximately 10.8 mg/l. This, in itself, exceeds what the alevins need. However, as the water flows through the incubator, usually going through a series of horizontally disposed trays located vertically one over the other, the oxygen content of the water entering the top tray and leaving from the bottom tray is inevitably diminished. Most of it is consumed by the alevins. As a result, air-saturated water when introduced at non-stressing flow rates is not able to support such a series of densely packed trays of alevins. For example, one commercial incubator employs sixteen trays in each vertical column, with the water passing successively from the top tray through each of the sixteen trays, leaving from the bottom tray. As a result, the water leaves the last tray at a perilously low level of oxygen unless the alevins are relatively sparsely distributed.

One of the objects of the present invention is that of providing a method by which alevins can be reared in such incubators under crowded conditions utilizing substantially the capacity of the trays or other such containers.

FALSE THEORIES HAD WARNED AGAINST THE USE OF EXTRA OXYGEN IN THE ALEVIN STAGE

Oxygen has been studied in relation to fish and fish-egg gas-bubble disease, a condition which may damage or kill the fish. Some investigators have warned against the use of excessive oxygen in the water, and some researchers have even attributed gas-bubble disease to the amount of oxygen in the water.

More recently, certain researchers have indicated that the total gas pressure gives rise to the problem and to the disease, rather than the oxygen content per se. Some tests have indicated that alevins could be held for a week within water containing supersaturated air before losses due to gas-bubble disease would develop.

Although many investigators have studied oxygen during the course of their work with gas-bubble disease, they have considered oxygen only as it relates to supersaturation. Other individuals who have studied the use of oxygen in fish farming have concerned themselves only with the enhancement of the water at fish stages following the alevin stage. The use of oxygenated water for rearing fingerlings and larger fish has previously been disclosed, as in U.S. Pat. No. 3,716,025 to Lawson, but has never been employed in hatcheries, largely due to the fear of causing gas-bubble disease; however, I have found that gas-bubble disease is not introduced by oxygenating water with oxygen of high purity in amount sufficient to supply the oxygen content needed by alevins.

PRIOR ART LIMITATIONS ON CROWDING

A manufacturer of commercial fish incubation cabinets has stated that up to 10,000 salmon eggs per tray may be incubated and hatched under normal water conditions. This statement is somewhat misleading because of its emphasis on numbers rather than on weight. Salmon eggs vary greatly in weight, for example from 0.1 to 0.4 grams per egg, so that the numbers would mean little unless the weight of the eggs were expressed. Manufacturers have suggested that "normal water conditions" include flows of 7 to 8 gallons per minute, but experience of which I am aware has indicated that the increase of water flow above 6 gallons per minute, or in some species even above 5 gallons per minute in this equipment, may stress the alevins and result in smaller alevins, more susceptible to disease. Nevertheless, some state fish hatcheries suggest that up to 10 gallons per minute of water and 10,000 eggs per tray can be used in this equipment.

Since trout eggs are much lighter than salmon eggs, the use of densities in terms of numbers alone is misleading. For example, 100 ounces of rainbow trout eggs correspond to about 45,000 eggs, but this does not mean that 45,000 salmon eggs could be reared in the same sized tray since the salmon eggs are from two to ten times the size of the rainbow trout egg.

It has been suggested that 8.8 pounds of salmon alevins at 0.4 gram each can be satisfactorily maintained at 10°–12° C. (50°–54° F.) without the use of additional oxygen. In practice, however, these data do not agree with the studies with which I have been connected indicating that only a maximum of 6.6 pounds of eggs, that is, 7500 eggs in a tray at an average weight of 0.4 gram each, can be maintained to the swimup stage without the use of supplemental oxygen. I have found, however, that by using supplemental oxygen, according to the present invention, the densities can readily be raised to accommodate 16,000 eggs or alevins per tray, representing an increase from 6.6 to 14.1 pounds of salmon eggs per tray.

SUMMARY OF THE INVENTION

The invention, in brief, comprises rearing alevins under crowded conditions in suitable containers by circulating oxygenated water—rather than aerated water—through them at nurturing temperatures and at desired flow rates, which may be between 0.04 and 0.6 centimeter per second, but for best results is between about 0.1 and 0.3 centimeter per second, e.g., 0.12 or 0.2 or 0.31 cm/sec., while supplying the water with sufficient dissolved oxygen so that the water leaving the last container or tray of any hatchery bank contains between approximately seven and fifty milligrams per liter of dissolved oxygen.

The invention is accomplished by dissolving oxygen—not air—into the water at a level greater than the amount of oxygen present where there is equilibrium between air and water in a saturated solution of air in the water. Thus, at the desired temperatures the oxygen level should be significantly greater than the 10.8 mg/l at 12° C. Depending on the apparatus and conditions used, it may vary, for example, from about 11 to about 55 mg/l (saturation). Oxygen can be dissolved in water already containing some or little dissolved air.

Conventional means for assuring a large degree of oxygenation of the water can be employed, as will be discussed below.

AMOUNT OF OXYGENATION REQUIRED

I have found that in order to rear the alevins under economically crowded conditions, it is important to maintain a flow of water such that its oxygen level does not drop below approximately 7 mg/l at any time during exposure to the alevins. As long as this is done and as long as steps are taken to insure that there is sufficient oxygenation at the beginning (or later) to maintain this level at the outlet, then the trays can be crowded with alevins to raise, for example, an amount per tray of from 6.6 pounds of eggs to 14.1 pounds, representing an increase in salmon eggs from approximately 7,500 to over 16,000 per tray.

In the prior-art the ratio of the weight of the salmonid biomass to the weight of the water in the incubation trays was relatively low—from about 34:1 to about 43:1. In the present invention the ratio may range from about 48:1 to about 100:1, with preferable ratios lying in the range of about 67:1 to 85:1.

For example, in the prior art the alevin weight has been in the range of about 350 to 425 kilograms per cubic meter of water, whereas the present invention employs alevin weights of about 500 to about 1000 kilograms per cubic meters of water, or preferably from about 650 to about 850.

Weight is more significant and more reliable than numbers, but the numbers are interesting. Salmon alevins average about 0.4 grams in weight. In the prior art, there were from about 900,000 to 1,100,000 salmon alevins per cubic meter; in the present invention there may be from 1,200,000 to 2,500,000 salmon alevins per cubic meter, preferably about 1,700,000 to 2,100,000. For trout, which average about 0.06 gram, the prior art had about 5,800,000 to 7,100,000 trout alevins per cubic meter, whereas in the present invention there are about 8,000,000 to 17,000,000, preferably about 11,000,000 to about 14,000,000 trout alevins per cubic meter.

DESCRIPTION OF SOME PREFERRED EMBODIMENTS

Figure 1:
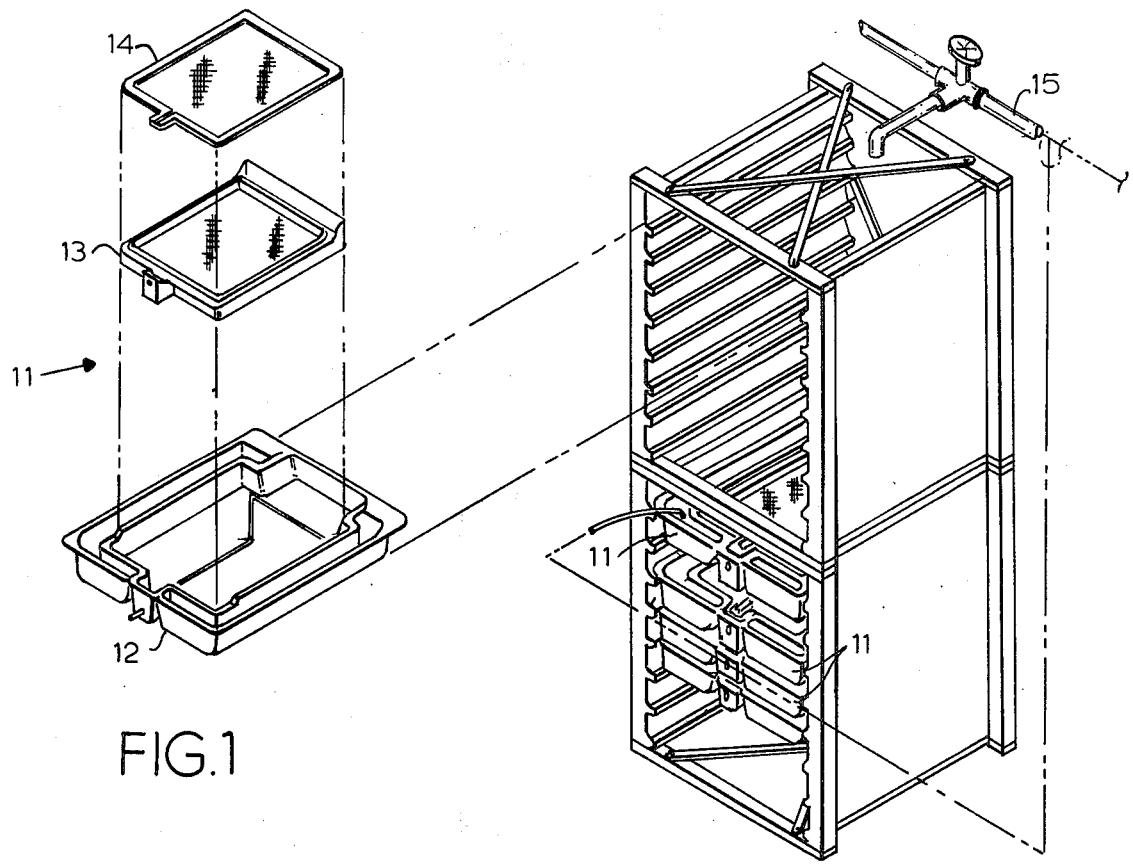
FIG. 1 is an isometric view of a salmonid-type of fish hatchery incubator bank as used in the present invention.

The drawings show a hatchery assembly in which each rack 10 is capable of holding sixteen trays 11. Each tray 11 contains a tray insert 12 which actually contains, at first the eggs, and, later, the alevins. Each tray insert 12 may contain a lower screen 13 and be covered during use by a guard screen 14, which is normally placed over the tray insert 12 to prevent loss of alevins. Water is supplied by a pipe 15 to the first or uppermost tray 11, passes successively through each tray 11 from top to bottom in the rack 10 and leaves from the bottom tray 11. The water is in the present invention, initially oxygenated by any suitable oxygenator 16 for obtaining the desired amount of oxygen. This includes sidestream oxygenation under pressure, the use of self-aspirating spargers for oxygen inside a closed vessel, submerged turbine spargers utilizing mechanical pumps to reuse oxygen as it diffuses from the liquid to the gas space, deep bed spargers for the dissolution of oxygen, and airlift pumps of different heights. Other techniques may be used, including surface aerators, but the methods just mentioned are generally more satisfactory.

In a stack 10 of so many trays 11 (e.g., sixteen) it is useful to introduce a supplemental stream of oxygenated water at some stage between the initial entry and the outlet. This should be done in such a way that the flow rate is not greatly increased, so that stress on the fish can be minimized. Thus, a small stream 17 of oxygenated water may be introduced into the ninth tray 11 from the top.

Figure 2:
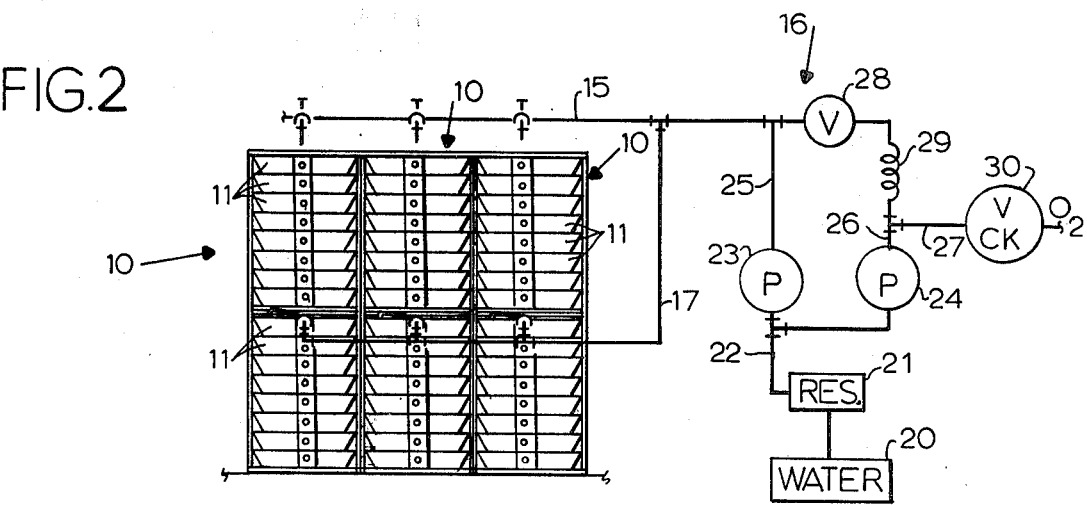
FIG. 2 is a view in front elevation of three banks like that of FIG. 1 in connection with a supply of well-oxygenated water.

As shown in FIG. 2, the water may (for example only) be oxygenated as follows in an oxygenator 16: a source of water 20 fills a reservoir 21, from which a stream 22 of water is withdrawn by two pumps 23 and 24, the pump 23 controlling a mainstream 25 of water, while the pump 23 sends water into a sidestream 26. To the sidestream 26 a stream 27 of compressed oxygen is fed via a check valve 30, the pressure being maintained by a valve 28, and a coil 29 of pipes preferably being used to provide enough length to enable the entering oxygen to be dissolved in the sidestream 26. The sidestream 26 then rejoins the mainstream 25, and passes to the two oxygenated water lines 15 and 17. Flow in the trays 11 is preferably kept between about 0.1 and about 0.3 centimeters per second, and definitely between 0.04 and 0.6 centimeters per second. The inlet oxygen should contain well above 12 mg per liter of $O_2$, preferably between 20 mg/l and 100 mg/l, approximately.

Other types of oxygenators and other types of incubators may, of course, be used, these being shown only by way of example.

The dissolved oxygen concentration within a conventional salmonid hatchery is a function of water temperature and the degree of air saturation. With adequate supplemental oxygen systems, according to this invention, only temperature remains of importance. Thus, for optimum operation of a salmonid hatchery, a dissolved oxygen level of about 7 to 11 mg/l at the outlet is desirable. Levels of 6 to 25 mg/l oxygen are recommended if manpower and/or automatic analyzers were available to alert operators in the event of a loss of oxygen supply. Survival of the alevins is endangered if the oxygen level drops anywhere below 3.5 to 4 mg/l for one day at 10°-12° C. At the upper level, there exists little incentive to operate at dissolved oxygen levels in excess of 50 mg/l.

EXPERIMENTAL

A variety of laboratory studies have been performed to assess the effect of salmonid egg density within a fish incubation cabinet available from Heath Tecna Company, Kent, Washington, with and without supplemental oxygen. Several examples follow:

EXAMPLE 1 (PRIOR ART)

Coho salmon eggs and alevins at densities of 6000-7000 eggs and/or alevins per tray, the eggs weighing 0.3-0.4 gm each, were incubated within a standard sixteen-tray Heath Tecna Fish Incubation Cabinet, Model 369 generally resembling that in the drawings, at 11°-12° C. with a flow rate of four to six gallons per minute. Air-saturated well water entering the top of each incubation cabinet continuously averaged 11 mg/l dissolved oxygen. The water, containing eyed eggs, had oxygen levels of 8.2-8.9 mg/l, but bottom trays containing alevins with nearly fully absorbed yolk sacs were found to have 4.7-6.2 mg/l dissolved oxygen concentrations. The low dissolved-oxygen content at the bottom of these stacks necessitated the premature transfer of these alevins at least a week to ten days prior to swimup to other stacks which contained cabinets of lower overall densities to avoid unacceptable mortalities greater than 10%.

EXAMPLE 2

Studies in higher oxygen levels

Additional studies were performed to assess the effects of various hatchery incubation practices. Either a half stack (8 trays) or single trays of the type described in Example 1 were used. These trays contained developing coho alevins and were evaluated for density, for dissolved oxygen, and for ammonia-nitrogen content of the aqueous environment for approximately two weeks prior to swimup.

Studies utilizing the half stack were designed to evaluate survivability as a function of increased oxygen partial pressure at a specified density of 7100 alevins per tray. Supersaturation of water during this study was accomplished by the use of sidestream oxygenation (see FIG. 2). Oxygen levels of the water at the top tray where oxygenated and well-water streams were mixed contained 20.3 to 23.3 mg oxygen per liter. At the bottom of this eight-tray cabinet, the dissolved oxygen level ranged from 7.6 to 11.5 mg/l. Ammonia-nitrogen levels of water within the bottom tray increased from 0.22 to only 0.51 mg/l during a period of twelve days prior to swimup.

Mortalities from these tests were equivalent to mortalities utilizing the standard Heath Tecna mode of operation, namely less than ten percent, in spite of the somewhat higher density of alevins.

EXAMPLE 3

Higher density studies

Two Heath Tecna sixteen-tray fish incubation cabinets like those of Example 1 were plumbed to permit sidestream oxygenation of a fraction of the inlet well-water. Egg densities of coho salmon were stocked at 9500 per tray for fifteen trays and 16,000 within the top tray only of each cabinet of the rack 10. Approximately 1.6 gallons per minute (gpm) of oxygen-enriched water (32 mg/l) was mixed with 1 gpm of ambient well-water (oxygen content=11.3 mg/l) as both entered the uppermost tray, giving 24 mg/l dissolved oxygen concentration. An additional flow of 2.4 gpm of the oxygen-enriched water was added to the ninth tray from the top during the entire study, to yield a total flow of 5 gpm through the lower eight trays of the stack.

The addition of oxygen-enriched water commenced one day prior to the initiation of egg hatching. During the subsequent month until ponding, periodic oxygen measurements, intensive ammonia-nitrogen, pH, and alkalinity data sets were obtained (see Tables II and III). These data indicate that essentially no alternation of pH or alkalinity occurred during the retention of the water within a cabinet. Ammonia-nitrogen accumulated but remained within acceptable limits as the water passed down through the cabinet. Dissolved oxygen concentrations were easily held at greater than 9 mg/l within each tray for the required incubation period by the splitting of the enriched-oxygenated water.

TABLE II

HIGH-DENSITY INCUBATION WATER QUALITY PROFILE*

| Stack | Tray | $NH_3-N$ (mg/l) | Diss. Oxygen (mg/l) | pH | Alkalinity (mg/l) |
|---|---|---|---|---|---|
| A | 1 | | | 6.9 | 52.0 |
| | 2 | 0.01 | 16.4 | | |
| | 4 | 0.08 | | | |
| | 6 | 0.16 | | | |
| | 8 | 0.24 | 9.4 | | |
| | 9+ | | 13.6 | | |
| | 10 | 0.31 | | | |
| | 12 | 0.23 | | | |
| | 14 | 0.26 | | | |
| | 16 | 0.32 | 10.0 | 6.8 | 50.0 |
| B | 1 | | 21.8 | | |
| | 2 | 0.08 | | | |
| | 4 | 0.07 | | | |
| | 6 | 0.20 | | | |
| | 8 | 0.74 | 11.6 | | |
| | 9+ | | 15.0 | | |
| | 10 | 0.19 | | | |
| | 12 | 0.29 | | | |
| | 14 | 0.29 | | | |
| | 16 | 0.34 | 11.4 | 6.8 | 49.0 |

*All analyses performed on effluent from tray.
+An additional 2.4 gpm was added within this tray.

TABLE III

HIGH-DENSITY INCUBATION WATER QUALITY PROFILE

| Stack | Tray | $NH_3-N$ (mg/l) | Diss. Oxygen (mg/l) | pH | Alkalinity (mg/l) |
|---|---|---|---|---|---|
| C | 1 | | | | |
| | 2 | 0.08 | 25.2 | 6.2 | 48.0 |
| | 4 | 0.22 | | 6.2 | |
| | 6 | 0.33 | | 6.2 | |
| | 8 | 0.40 | 13.2 | 6.3 | |
| | 9+ | | 21.4 | | |
| | 10 | 0.27 | | 6.3 | |
| | 12 | 0.31 | | 6.3 | |
| | 14 | 0.37 | | 6.4 | |
| | 16 | 0.40 | 13.6 | 6.4 | 48.0 |
| D | 1 | | 24.4 | | |
| | 2 | 0.0 | | 6.3 | 48.0 |
| | 4 | 0.14 | | 6.4 | |
| | 6 | 0.14 | | 6.4 | |
| | 8 | 0.30 | 12.0 | 6.4 | |
| | 9+ | | 21.0 | | |
| | 10 | 0.19 | | 6.5 | |
| | 12 | 0.28 | | 6.5 | |
| | 14 | 0.29 | | 6.6 | |
| | 16 | 0.44 | 11.0 | 6.6 | 50.0 |

+An additional 2.4 gpm was added within this tray.

Fish ponded from trays at densities of 9,500–16,000 fry per tray exhibited low post-hatch mortalities (~1.8 percent). No gas-bubble disease was evident, even though oxygen supersaturated water was used in this experiment.

These data indicate that a minimum 50–60 percent increase in hatchery capacity may be obtained by oxygenation of the hatchery influent waters during the critical period of alevin development.

All of the above examples utilized a single pass system. With a biological filtering system, the utility of oxygen-enriched water would not only assist the development of high-density alevin incubation but would also enable a closed-loop cleaning apparatus to function most effectively.

I claim:

1. A method of rearing alevins in a hatchery comprising:
   crowding eggs and the alevins into continaner means to provide a biomass-to-water weight ratio of between 48:1 and 100:1,
   preparing oxygenated water by dissolving oxygen, substantially free from other gases, in water already containing air up to a saturating amount, so that the water is supersaturated with oxygen, and
   circulating said oxygenated water through said container means at a temperature of 7°–17° C. at a flow rate sufficient to avoid buildup of ammonia toxicity and insufficient to stress the alevins.

2. The method of claim 1 wherein the water leaving said container means retains between 7 and 50 mg per liter dissolved oxygen.

3. The method of claim 1 wherein the water flow rate lies between about 0.1 and about 0.3 centimeters per second.

4. A method of rearing alevins in a hatchery, comprising:
   crowding eggs and alevins into each of a series of trays, which are stacked vertically to provide a biomass-to-water weight ratio of between 48:1 and 100:1,
   dissolving oxygen substantially free from other gases in aerated water containing air in amounts up to saturation to produce oxygenated water supersaturated with oxygen,
   sending said oxygenated water into the topmost said tray at a temperature of 11°–12° C. at a flow rate sufficient to avoid buildup of ammonia toxicity and insufficient to stress the alevins,
   sending the water from the topmost tray into the one directly below it and from one tray to another down the stack to the bottommost tray, and
   discharging the water from the bottommost tray.

5. The method of claim 4 wherein additional said oxygenated water is added to at least one tray in between the top tray and the bottom tray, said additional water containing dissolved oxygen at above 12 mg per liter.

6. The method of claim 5 wherein both said oxygenated water and said additional oxygenated water contain at least 20 mg per liter of dissolved oxygen.

7. A method of rearing alevins in a hatchery, comprising:
   crowding eggs and alevins into container means to give a ratio of the weight of the biomass to the weight of the water of between 48:1 and 100:1,
   dissolving in water that contains air in an amount up to saturation and at a temperature of 7°–17° C. oxygen substantially free from other gases in amount sufficient to provide said water with a total dissolved oxygen content of at least 20 milligrams per liter of water, and circulating water through said container means at a temperature of 7°–17° C. at a flow rate of 0.04 to 0.6 centimeters per second, so that the water leaving said container means contains at least approximately 7 mg per liter dissolved oxygen.

8. The method of claim 7 wherein said flow rate is between about 0.1 and 0.3 centimeters per second.

9. A method of rearing alevins in a hatchery, comprising:

crowding eggs and alevins into container means to give a ratio of the weight of the biomass to the weight of the water in the container means of between 48:1 and 100:1, dissolving in water that already contains air in an amount up to saturation and is at a temperature of 7°–17° C., oxygen substantially free from other gases, in an amount sufficient to provide said water with a total dissolved oxygen content between 20 and 100 milligrams per liter of water, and circulating oxygenated water through said container means at a temperature of 7°–17° C. at a flow rate of 0.04 to 0.6 centimeters per second, so that the water leaving said container means retains between 7 and 50 Mg per liter dissolved oxygen.

10. The method of claim 9 wherein said flow rate is between about 0.1 and about 0.3 centimeters per second.

11. A method of rearing alevins in a hatchery, comprising:

crowding eggs and alevins into each of a series of water-containing trays, which are stacked vertically to give a ratio of the biomass weight to the weight of the water of 65:1 to 85:1, dissolving in water already containing air in an amount up to saturation, oxygen free from other gases and in an amount to provide water containing between 20 and 100 milligrams per liter of dissolved oxygen, sending water into the topmost said tray at a temperature of 11°–12° C. at a flow rate of 0.1 to 0.3 centimeters per second, sending the water from the topmost tray into the one directly below it and from one tray to another down the stack to the bottommost tray, and discharging the water from the bottommost tray, so that the water leaving said bottommost tray contains between 7 and 25 milligrams per liter dissolved oxygen.

12. The method of claim 11 wherein additional water is added to at least one tray in between the top tray and the bottom tray, said additional water containing additional dissolved oxygen at between 20 and 100 milligrams per liter.

* * * * *